(12) United States Patent
Cricri et al.

(10) Patent No.: US 11,068,722 B2
(45) Date of Patent: Jul. 20, 2021

(54) METHOD FOR ANALYSING MEDIA CONTENT TO GENERATE RECONSTRUCTED MEDIA CONTENT

(71) Applicant: Nokia Technologies Oy, Espoo (FI)

(72) Inventors: Francesco Cricri, Tampere (FI); Mikko Honkala, Espoo (FI); Emre Baris Aksu, Tampere (FI); Xingyang Ni, Tampere (FI)

(73) Assignee: Nokia Technologies Oy, Espoo (FI)

( * ) Notice: Subject to any disclaimer, the term of this patent is extended or adjusted under 35 U.S.C. 154(b) by 88 days.

(21) Appl. No.: 16/342,084

(22) PCT Filed: Sep. 27, 2017

(86) PCT No.: PCT/FI2017/050682
§ 371 (c)(1),
(2) Date: Apr. 15, 2019

(87) PCT Pub. No.: WO2018/078213
PCT Pub. Date: May 3, 2018

(65) Prior Publication Data
US 2019/0251360 A1 Aug. 15, 2019

(30) Foreign Application Priority Data
Oct. 27, 2016 (GB) .................................... 1618160

(51) Int. Cl.
*G06K 9/46* (2006.01)
*G06N 3/04* (2006.01)
(Continued)

(52) U.S. Cl.
CPC ..... *G06K 9/00744* (2013.01); *G06K 9/00664* (2013.01); *G06K 9/00711* (2013.01);
(Continued)

(58) Field of Classification Search
None
See application file for complete search history.

(56) References Cited

U.S. PATENT DOCUMENTS

2016/0328630 A1* 11/2016 Han ...................... G06K 9/6272
2017/0243053 A1* 8/2017 Li ........................ G06K 9/00281
(Continued)

FOREIGN PATENT DOCUMENTS

CN     105072373 A    11/2015
CN     105095862 A    11/2015
(Continued)

OTHER PUBLICATIONS

Krizhevsky et al., "ImageNet Classification with Deep Convolutional Neural Networks", Advances in Neural Information Processing Systems 25 (NIPS), 2012, pp. 1-9.
(Continued)

*Primary Examiner* — Idowu O Osifade
(74) *Attorney, Agent, or Firm* — Harrington & Smith

(57) ABSTRACT

The invention relates to a method, an apparatus and a computer program product for analyzing media content. The method comprises receiving media content; performing feature extraction of the media content at a plurality of convolution layers to produce a plurality of layer-specific feature maps; transmitting from the plurality of convolution layers a corresponding layer-specific feature map to a corresponding de-convolution layer of a plurality of de-convolution layers via a recurrent connection between the plurality of convolution layers and the plurality of de-convolution layers; and generating a reconstructed media content based on the plurality of feature maps.

20 Claims, 13 Drawing Sheets

(51) Int. Cl.
G06K 9/62 (2006.01)
G06K 9/00 (2006.01)
(52) U.S. Cl.
CPC ......... *G06K 9/4628* (2013.01); *G06K 9/6234* (2013.01); *G06N 3/04* (2013.01); *G06N 3/0445* (2013.01); *G06N 3/0454* (2013.01)

(56) References Cited

U.S. PATENT DOCUMENTS

| | | | | |
|---|---|---|---|---|
| 2017/0249445 | A1* | 8/2017 | Devries | A61B 5/1118 |
| 2018/0053090 | A1* | 2/2018 | Voelker | G06N 3/063 |
| 2018/0114115 | A1* | 4/2018 | Liang | G06N 3/04 |

FOREIGN PATENT DOCUMENTS

| | | |
|---|---|---|
| CN | 105279495 A | 1/2016 |
| CN | 105760835 A | 7/2016 |
| CN | 105868691 A | 8/2016 |
| CN | 106056628 A | 10/2016 |
| GB | 2555136 A | 4/2018 |

OTHER PUBLICATIONS

Rasmus et al., "Semi-Supervised Learning with Ladder Networks", Neural and Evolutionary Computing (arXiv), Nov. 24, 2015, pp. 1-19.

Srivastava et al., "Unsupervised Learning of Video Representations using LSTMs", Computer Vision and Pattern Recognition, Jan. 4, 2016, 12 pages.

Goodfellow et al., "Generative Adversarial Networks", Machine Learning, Jun. 10, 2014, pp. 1-9.

Patraucean et al., "Spatio-Temporal Video Autoencoder with Differentiable Memory", Machine Learning, Sep. 1, 2016, pp. 1-13.

Search Report received for corresponding United Kingdom Patent Application No. 1618160.4, dated Apr. 24, 2017, 4 pages.

Finn et al., "Unsupervised Learning for Physical Interaction through Video Prediction", Machine Learning, Oct. 17, 2016, pp. 1-12.

Lotter et al., "Unsupervised Learning of Visual Structure using Predictive Generative Networks", Machine Learning, Jan. 20, 2016, pp. 1-12.

Ronneberger et al., "U-Net: Convolutional Networks for Biomedical Image Segmentation", Computer Vision and Pattern Recognition, May 18, 2015, pp. 1-8.

Long et al., "Fully Convolutional Networks for Semantic Segmentation", IEEE Conference on Computer Vision and Pattern Recognition (CVPR), Jun. 7-12, 2015, 10 pages.

International Search Report and Written Opinion received for corresponding Patent Cooperation Treaty Application No. PCT/FI2017/050682, dated Feb. 7, 2018, 14 pages.

Mao et al., "Image Restoration Using Very Deep Convolutional Encoder-Decoder Networks with Symmetric SkipConnections", 29th Conference on Neural Information Processing Systems (NIPS), Sep. 1, 2016, pp. 1-9.

Yao et al., "Describing Videos by Exploiting Temporal Structure", IEEE International Conference on Computer Vision, 2015, pp. 4507-4515.

Yeh et al., "Semantic Image Inpainting with Deep Generative Models", Computer Vision and Pattern Recognition, Jul. 26, 2016, pp. 1-9.

Extended European Search Report received for corresponding European Patent Application No. 17865888.6, dated Apr. 17, 2020, 9 pages.

Oh et al., "Action-Conditional Video Prediction using Deep Networks in Atari Games", Proceedings of the 28th International Conference on Neural Information Processing Systems, vol. 2, Dec. 22, 2015, 9 pages.

Brabandere et al., "Dynamic Filter Networks", Proceedings of the 30th International Conference on Neural Information Processing Systems, Jun. 6, 2016, 10 pages.

Michalski et al., "Modeling Deep Temporal Dependencies with Recurrent Grammar Cells", Proceedings of the 27th International Conference on Neural Information Processing Systems, vol. 2, Dec. 2014, pp. 1-9.

Sutskever et al., "Sequence to Sequence Learning with Neural Networks", Proceedings of the 27th International Conference on Neural Information Processing Systems, vol. 2, Dec. 14, 2014, 9 pages.

* cited by examiner

METHOD FOR ANALYSING MEDIA CONTENT TO GENERATE RECONSTRUCTED MEDIA CONTENT

RELATED APPLICATION

This application was originally filed as Patent Cooperation Treaty Application No. PCT/FI2017/050682 filed Sep. 27, 2017 which claims priority benefit to GB Patent Application No. 1618160.4, filed Oct. 27, 2016.

TECHNICAL FIELD

The present solution relates to computer vision and machine learning, and particularly to a method for analyzing media content.

BACKGROUND

Many practical applications rely on the availability of semantic information about the content of the media, such as images, videos, etc. Semantic information is represented by metadata which may express the type of scene, the occurrence of a specific action/activity, the presence of a specific object, etc. Such semantic information can be obtained by analyzing the media.

The analysis of media is a fundamental problem which has not yet been completely solved. This is especially true when considering the extraction of high-level semantics, such as object detection and recognition, scene classification (e.g., sport type classification) action/activity recognition, etc.

Recently, the development of various neural network techniques has enabled learning to recognize image content directly from the raw image data, whereas previous techniques consisted of learning to recognize image content by comparing the content against manually trained image features. Very recently, neural networks have been adapted to take advantage of visual spatial attention, i.e. the manner how humans conceive a new environment by focusing first to a limited spatial region of the scene for a short moment and then repeating this for a few more spatial regions in the scene in order to obtain an understanding of the semantics in the scene.

Although the deep neural architecture have been very successful in many high-level tasks such as image recognition and object detection, achieving semantic video segmentation which is large scale pixel-level classification or labelling is still challenging. There are several reasons. Firstly, the popular convolutional neural network (CNN) architectures utilize local information rather than global context for prediction, due to the use of convolutional kernels. Secondly, existing deep architectures are predominantly centered on modelling the image data, whilst how to perform end-to-end modeling and prediction of video data using deep neural networks for pixel labelling problem is still unknown.

SUMMARY

Now there has been invented an improved method and technical equipment implementing the method, by which the above problems are alleviated. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method comprising receiving media content; performing feature extraction of the media content at a plurality of convolution layers to produce a plurality of layer-specific feature maps; transmitting from the plurality of convolution layers a corresponding layer-specific feature map to a corresponding de-convolution layer of a plurality of de-convolution layers via one or more recurrent connections between the plurality of convolution layers and the plurality of de-convolution layers; and generating a reconstructed media content based on the plurality of feature maps.

According to an embodiment, the method further comprises receiving by the each of the plurality of de-convolution layers a feature map directly from a corresponding convolution layer of the plurality of convolution layers.

According to an embodiment, the media content comprises video frames, and wherein the reconstructed media content comprises predicted future video frames.

According to an embodiment, the recurrent connection comprises a Long Short-Term Memory network.

According to an embodiment, the method further comprises providing the reconstructed media content and the corresponding original media content to a discriminator system to determine whether the reconstructed media content is real.

According to an embodiment, the discriminator system comprises a plurality of discriminators corresponding the plurality of de-convolution layers.

According to an embodiment, the method further comprises receiving by each of the plurality of discriminators reconstructed media content from a corresponding de-convolution layer of a plurality of additional de-convolution layers.

According to a second aspect, there is provided an apparatus comprising at least one processor, memory including computer program code, the memory and the computer program code configured to, with the at least one processor, cause the apparatus to perform at least the following: to receive media content; to perform feature extraction of the media content at a plurality of convolution layers to produce a plurality of layer-specific feature maps; to transmit from the plurality of convolution layers a corresponding layer-specific feature map to a corresponding de-convolution layer of a plurality of de-convolution layers via a recurrent connection between the plurality of convolution layers and the plurality of de-convolution layers; and to generate a reconstructed media content based on the plurality of feature maps.

According to an embodiment, the apparatus further comprises computer program code configured to cause the apparatus to receive by the each of the plurality of de-convolution layers a feature map directly from a corresponding convolution layer of the plurality of convolution layers.

According to an embodiment, the media content comprises video frames, and wherein the reconstructed media content comprises predicted future video frames.

According to an embodiment, the recurrent connection comprises a Long Short-Term Memory network.

According to an embodiment, the apparatus further comprises computer program code configured to cause the apparatus to provide the reconstructed media content, or media content generated by the apparatus, and the corresponding original media content to a discriminator system to determine whether the reconstructed media content is real.

According to an embodiment, the discriminator system comprises a plurality of discriminators corresponding the plurality of de-convolution layers.

According to an embodiment, the apparatus further comprises computer program code configured to cause the apparatus to receive by each of the plurality of discriminators reconstructed media content from a corresponding de-convolution layer of a plurality of additional de-convolution layers.

According to a third aspect, there is provided an apparatus comprising: means for receiving media content; means for performing feature extraction of the media content at a plurality of convolution layers to produce a plurality of layer-specific feature maps; means for transmitting from the plurality of convolution layers a corresponding layer-specific feature map to a corresponding de-convolution layer of a plurality of de-convolution layers via a recurrent connection between the plurality of convolution layers and the plurality of de-convolution layers; and means for generating a reconstructed media content based on the plurality of feature maps.

According to a fourth aspect, there is provided a computer program product embodied on a non-transitory computer readable medium, comprising computer program code configured to, when executed on at least one processor, cause an apparatus or a system to receive media content; to perform feature extraction of the media content at a plurality of convolution layers to produce a plurality of layer-specific feature maps; to transmit from the plurality of convolution layers a corresponding layer-specific feature map to a corresponding de-convolution layer of a plurality of de-convolution layers via a recurrent connection between the plurality of convolution layers and the plurality of de-convolution layers; and to generate a reconstructed media content based on the plurality of feature maps.

According to an embodiment, the computer program product further comprises computer program code configured to cause the apparatus or system to receive by the each of the plurality of de-convolution layers a feature map directly from a corresponding convolution layer of the plurality of convolution layers.

According to an embodiment, the media content comprises video frames, and wherein the reconstructed media content comprises predicted future video frames.

According to an embodiment, the recurrent connection comprises as a Long Short-Term Memory network.

According to an embodiment, the computer program product further comprises computer program code configured to cause the apparatus or system to provide the reconstructed media content, or media content generated by the apparatus, and the corresponding original media content to a discriminator system to determine whether the reconstructed media content is real.

DESCRIPTION OF THE DRAWINGS

In the following, various embodiments of the invention will be described in more detail with reference to the appended drawings, in which.

DESCRIPTION OF EXAMPLE EMBODIMENTS

Figure 1:
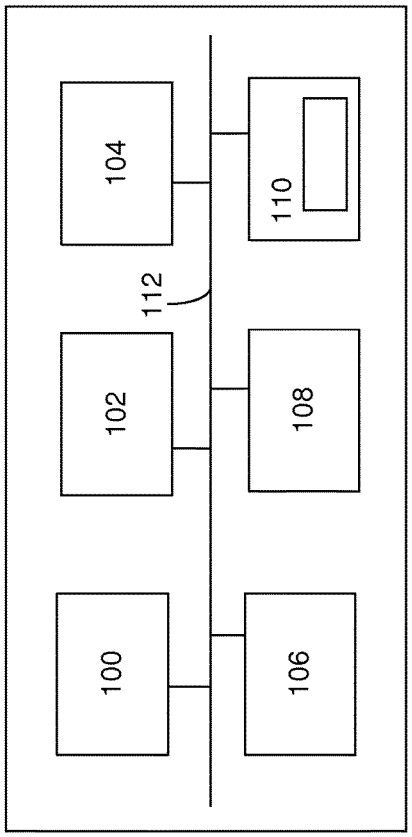
FIG. 1 shows a computer graphics system suitable to be used in a computer vision or image processing process according to an embodiment.

FIG. 1 shows a computer graphics system suitable to be used in image processing, for example in computer vision process according to an embodiment. The generalized structure of the computer graphics system will be explained in accordance with the functional blocks of the system. Several functionalities can be carried out with a single physical device, e.g. all calculation procedures can be performed in a single processor if desired. A data processing system of an apparatus according to an example of FIG. 1 comprises a main processing unit 100, at least one memory 102, a storage device 104, an input device 106, an output device 108, and a graphics subsystem 110, which are all connected to each other via a data bus 112.

The main processing unit 100 is a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data within the data processing system 100. Computer program code resides in the memory 102 for implementing, for example, computer vision process. The input device 106 inputs data into the system while the output device 108 receives data from the data processing system and forwards the data, for example to a display. The data bus 112 is shown as a single line, but it may comprise any combination of the following: a processor bus, a PCI bus, a graphical bus, an ISA bus. Accordingly, a skilled person readily recognizes that the apparatus may be any data processing device, such as a computer device, a personal computer, a server computer, a cloud computer, a mobile phone, a smart phone or an Internet access device, for example Internet tablet computer.

It needs to be understood that different embodiments allow different parts to be carried out in different elements. For example, various processes of the computer vision system may be carried out in one or more processing devices; for example, entirely in one computer device, or in one server device or across multiple user devices. The elements of computer vision process may be implemented as a software component residing on one device or distributed across several devices, as mentioned above, for example so that the devices form a so-called cloud.

Data, and visual data in particular, may be analyzed by deep learning. Deep learning is a sub-field of machine learning which has emerged in the recent years. Deep learning may involve learning of multiple layers of nonlinear processing units, either in supervised, unsupervised, or in semi-supervised manner. These layers form a hierarchy of layers. Each learned layer extracts feature representations from the input data. Features from lower layers represent low-level semantics (i.e. less abstract concepts, such as edges and texture), whereas higher layers represent higher-level semantics (i.e., more abstract concepts, like scene class). Unsupervised learning applications typically include pattern analysis and representation (i.e., feature) learning, whereas supervised learning applications may include classification of image objects (in the case of visual data).

Deep learning techniques may be used for recognizing and detecting objects in images or videos with great accuracy, outperforming previous methods. The fundamental difference of deep learning image recognition technique compared to previous methods is learning to recognize image objects directly from the raw data, whereas previous techniques are based on recognizing the image objects from hand-engineered features (e.g. SIFT features). During the training stage, deep learning techniques build hierarchical computation layers which extract features of increasingly abstract level.

Thus, at least the initial layers of an artificial neural network represent a feature extractor. An example of a feature extractor in deep learning techniques is included in the Convolutional Neural Network (CNN), shown in FIG. 2. A CNN is composed of one or more convolutional layers, fully connected layers, and a classification layer on top. CNNs are easier to train than other deep neural networks and have fewer parameters to be estimated. Therefore, CNNs are highly attractive architecture to use, especially in image and speech applications.

Figure 2:
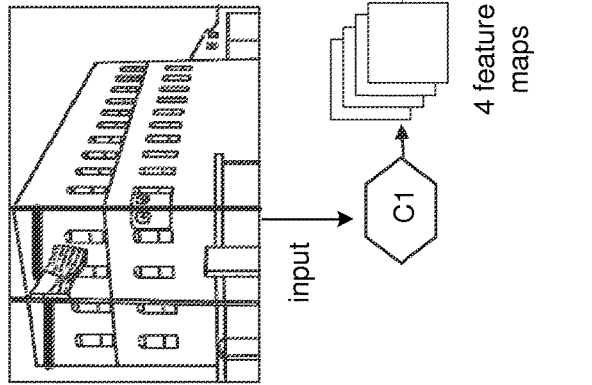
FIG. 2 shows an example of a Convolutional Neural Network used in computer vision or image processing systems.

In FIG. 2, the input to a CNN is an image, but any other media content object, such as video file, could be used as well. Each layer of a CNN represents a certain abstraction (or semantic) level, and the CNN extracts multiple feature maps. A feature map may for example comprise a dense matrix of Real numbers representing values of the extracted features. The CNN in FIG. 2 has only three feature (or abstraction, or semantic) layers C1, C2, C3 for the sake of simplicity, but CNNs may have more than three, and even over 20 convolution layers.

The first convolution layer C1 of the CNN consists of extracting 4 feature-maps from the first layer (i.e. from the input image). These maps may represent low-level features found in the input image, such as edges and corners. The second convolution layer C2 of the CNN, consisting of extracting 6 feature-maps from the previous layer, increases the semantic level of extracted features. Similarly, the third convolution layer C3 may represent more abstract concepts found in images, such as combinations of edges and corners, shapes, etc. The last layer of the CNN, referred to as fully connected Multi-Layer Perceptron (MLP) may include one or more fully-connected (i.e., dense) layers and a final classification layer. The MLP uses the feature-maps from the last convolution layer in order to predict (recognize) for example the object class. For example, it may predict that the object in the image is a house.

The present embodiments relate generally to digital media, and particularly to deep learning and computer vision. Deep learning is a field, which studies artificial neural networks (ANN), also referred to as neural network (NN). A neural network is a computation graph, usually made of several layers of successive computation. Each layer is made of units or neurons computing an elemental/basic computation.

The goal of a neural network is to transform the input data into a more useful output. One example is classification, where input data is classified into one of N possible classes (e.g., classifying if an image contains a cat or a dog). Another example is regression, where input data is transformed into a Real number (e.g. determining the music beat of a song). Yet another example is generating an image from a noise distribution.

The power of neural networks comes from the internal representation which is built inside the layers. This representation is distributed among many units and is hierarchical, where complex concepts build on top of simple concepts. A neural network has two main modes of operation: training phase and testing phase. The training phase is the development phase, where the network learns to perform the final task. Learning consists in iteratively updating the weights or connections between units. The testing phase is the phase in which the network actually performs the task. Learning can be performed in several ways. The main ones are supervised, unsupervised, and reinforcement learning. In supervised training, the model is provided with input-output pairs, where the output is usually a label. In supervised training, the network is provided only with input data (and also with output raw data in case of self-supervised training). In reinforcement learning, the supervision is more sparse and less precise; instead of input-output pairs, the network gets input data and, sometimes, delayed rewards in the form of scores (E.g., −1, 0, or +1).

In general, neural networks can be categorized into two types: discriminative and generative. Classifiers and regressors are discriminative models. Networks generating new data (such as images) are generative models. Discriminative models may be trained by supervised methods. Generative models may be trained by unsupervised or self-supervised methods. Reinforcement learning methods may be used for example when the objective function is not differentiable. Furthermore, discriminative models may be first pre-trained to generate data, for example by unsupervised training, and then fine-tuned to discriminate data (i.e., to classify or regress) by supervised training.

Image analysis and image classification through CNN may reach human-level in some cases. However, analysis of videos is more difficult. For example, video classification and action/activity classification is behind object classification. One of the main reasons is that the internal representations of neural networks for video analysis do not encode the implicit dynamic information present in videos in a sufficiently effective way. Learning good internal representations is fundamental for the inference: there can be a pre-training stage in which internal representations are built in unsupervised (or self-supervised) way, and then a final supervised fine-tuning stage in which the internal representations are leveraged for solving the specific classification task at hand. Another reason for requiring good unsupervised performance from video analysis methods is the fact that it may not be feasible to get human annotations to all frames in all videos, whereby representations need to be derived from the unlabeled information in the video frames themselves.

Apart from video classification and activity recognition, interesting issue is encoding a prediction of how future actions will affect the real world. This is how humans unconsciously reason before doing things. Humans don't need to have the experience of performing every single action in order to known the consequence of each action; this is because humans are able to build an internal representation of the world, and thus to predict what will happen. For example, people don't need to have experienced the fact that if they walk against a wall, they would crash. People simply predict it and avoid it. This is needed for many use-cases, such as robotics (for example, for grasping or moving objects).

The present embodiments can be used for prediction of future video frames. Based on the above, this can be used for building an internal representation for fine-tuning a supervised model, or for predicting how a certain action would affect the real world, or for performing tasks such as video inpainting/denoising and video segmentation.

Some methods for performing video prediction can be found from related technology. However, these methods often perform poorly either in the prediction of movement or in the quality of actual visual content (e.g. presence of blur).

A neural encoder-decoder model is a neural network made of two parts: Encoder and decoder. Encoder is a neural network which takes in an input image and extracts feature maps at multiple layers, and outputs the feature maps from the last layer. Decoder is a neural network which may take in feature maps from any of the encoder layers and reconstructs the image with multiple layers of computation. This kind of model encodes data into a lower-dimensional vector (the feature maps) and reconstructs the data from that vector. Reconstruction of data has been described as one example application, but embodiments of the invention include also generation of data.

Figure 3:
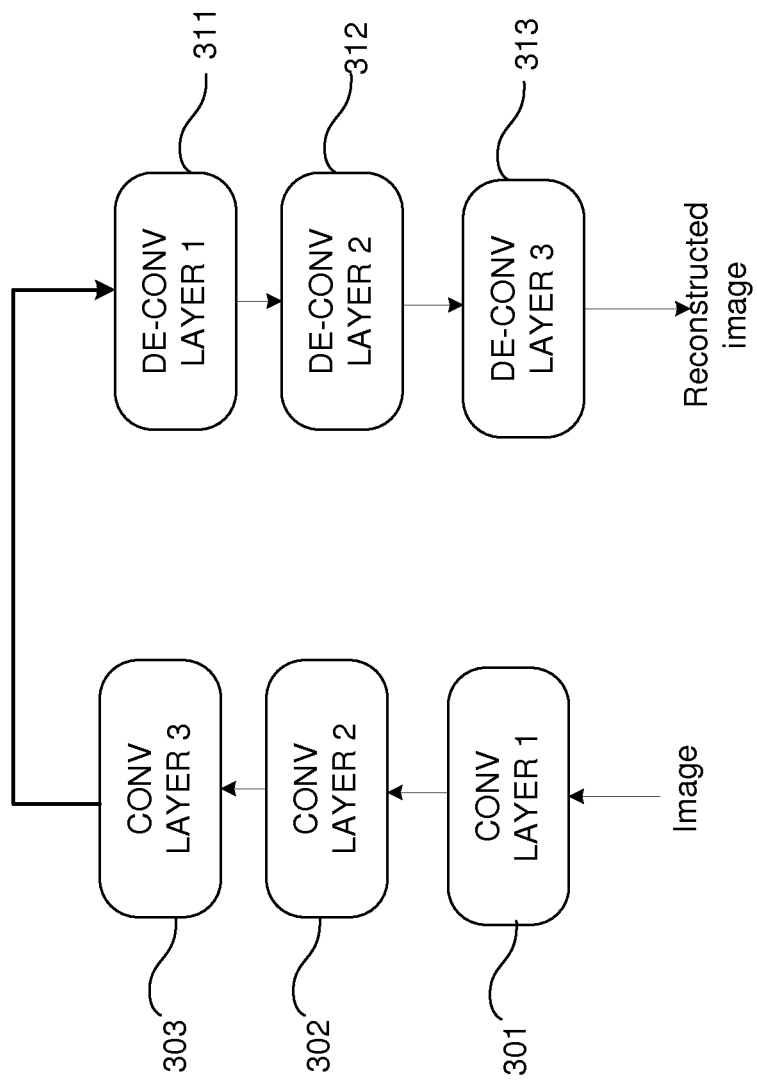
FIG. 3 shows an example of an encoder-decoder system implemented as a convolutional network and a de-convolutional network.

Applications include denoising an input image, inpainting missing data, pre-training an encoder for feature extraction, etc. The structure of the encoder and the decoder can be any type, but, for visual analysis, the most common structure is a convolutional network (CNN) for the encoder and a de-convolutional network (de-CNN) for the decoder. The de-CNN is a network with layers performing transposed convolution. FIG. 3 shows an encoder-decoder system implemented as a convolutional network (301, 302, 303) and a de-convolutional network (311, 312, 313) used for image denoising.

Figure 4:
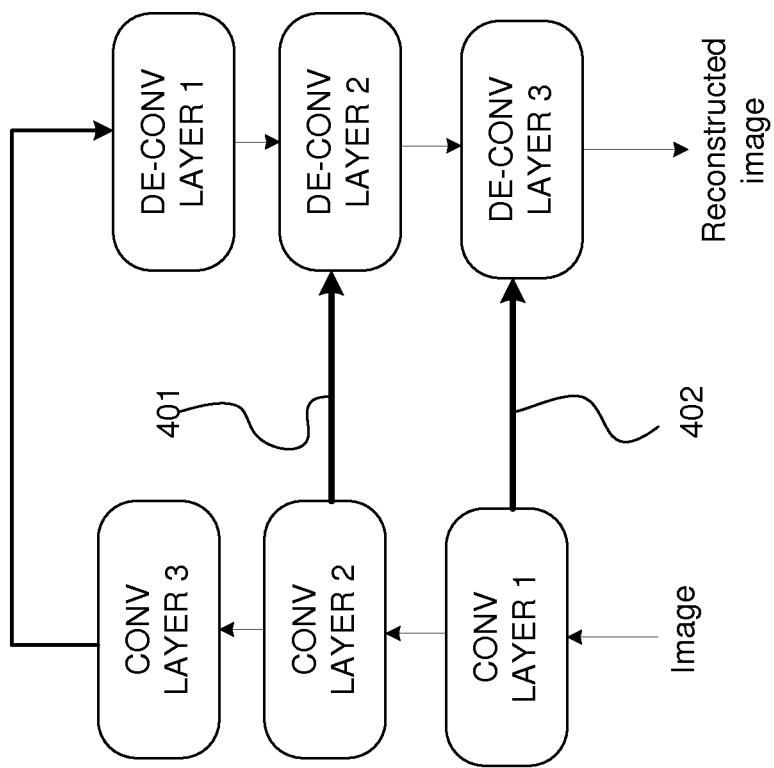
FIG. 4 shows an example of an encoder-decoder system with lateral connections.

In this kind of system, the decoder needs to reconstruct data only from a small, low-dimensional vector (the output of the encoder's last layer 303). Furthermore, this vector encodes only semantically high-level information, such as shapes, objects, etc. The intermediate and lower layers' information is not directly used for reconstruction. This information can be utilized by adding connections between the encoder and decoder in order to help the decoder to get more information from intermediate layers (Conv layer 1, Conv layer 2). These skip connections between the layers of the encoder and decoder drastically improve denoising performance. FIG. 4 illustrates an encoder-decoder with lateral connections 401, 402. With the system of FIG. 4, the denoising performance is clearly improved.

Figure 5:
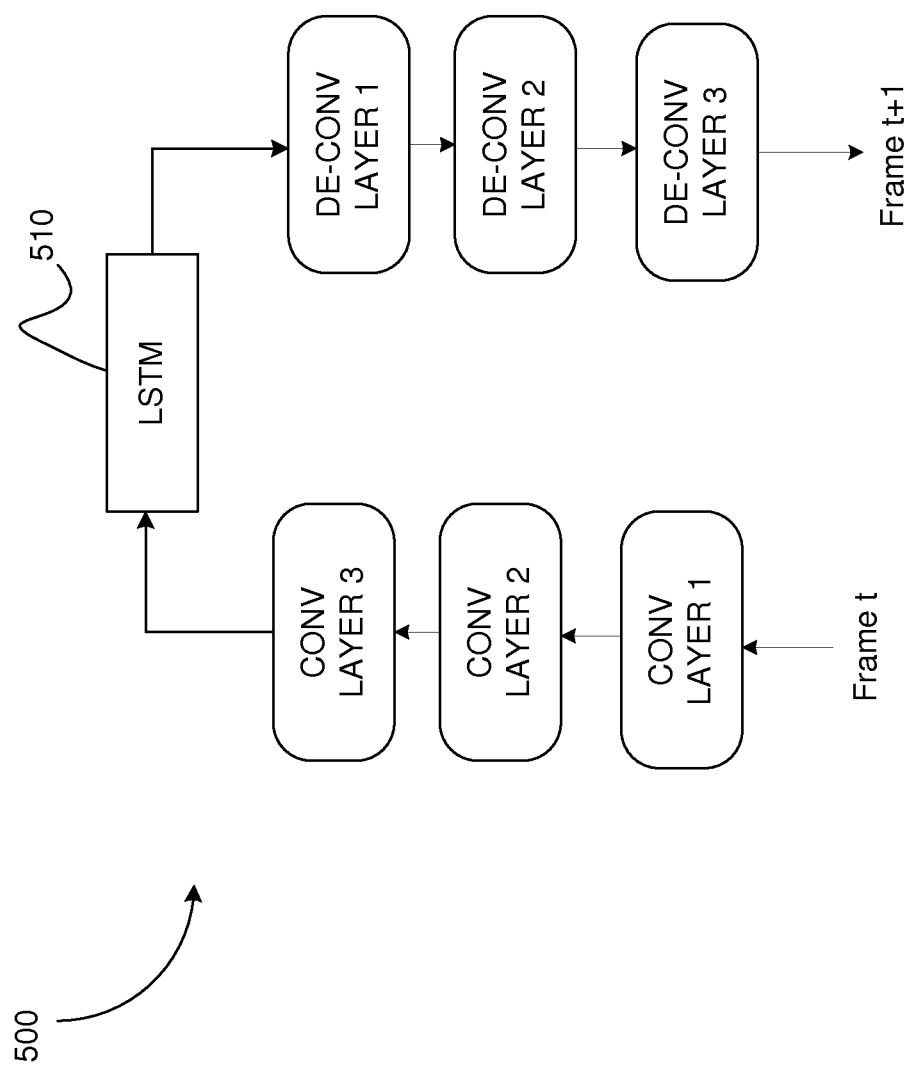
FIG. 5 shows an example of encoder-decoder system with a recurrent network.

The encoder-decoder structure can be extended from static images to video by adding modules which model the temporal aspect of videos (e.g. movements of objects). Videos or other types of data with temporal evolution (e.g., video, speech, audio, text) may be analyzed based on Recurrent Neural Networks (RNN), where the hidden representation (hidden state h) is updated based not only on the current input but also on the hidden representations obtained from past inputs. In other words, RNNs work by recurrently (iteratively) looking at the input at each time step t and building an internal representation of the whole sequence so far. This internal representation is a "summary" and can be thought of as a "memory". The most advanced and effective type of RNN is the Long Short-Term Memory (LSTM) network, which uses special gating mechanisms that help training RNNs more effectively. However, several types of recurrent neural networks exist and this invention is not limited to any specific type of RNN or LSTM. For example, LSTMs may be implemented in various types of networks and the term LSTM is to be understood to cover any type of LSTM variants. RNNs may be used for many applications, such as for accumulating a summary of video frames for performing video classification, activity classification, etc. In particular, RNNs may be used for predicting future video frames. FIG. 5 illustrates an encoder-decoder model with additional RNN in the form of LSTM 510 for modeling the temporal aspect in video. As shown in FIG. 5, the video prediction is performed by giving N frames starting from frame 1 to frame t (i.e., frames [1, . . . , t]) to the system 500, and getting the next frame t+1 as an output.

The present embodiments consider the problem of predicting future video frames, given some video frames from the past.

The results of the embodiments comprise a trained artificial neural network which can predict future video frames, and can be used for inpainting/denoising a video, for video segmentation, for being fine-tuned in supervised way for video classification or activity recognition, or for predicting the consequence of actions and thus choosing the most appropriate actions given a goal.

The present embodiments relate to a system and a training procedure which consist of using a neural encoder-decoder model, where the encoder and decoder may be convolutional and de-convolutional (or transpose-convolutional) networks, respectively, and each computation layer of the encoder and the decoder may be connected via recurrent connections. The recurrent connections may comprise lateral recurrent connections.

In an additional embodiment, the computation layers of the encoder and decoder are further connected by non-recurrent connections (e.g., feedforward connections), so that the input at the last time-step influences directly (and thus without the recurrent layer) the reconstructed output. The non-recurrent connections may comprise lateral non-recurrent connections.

In an additional embodiment, the encoder and/or decoder may also include internal skip connections between the different convolutional layers. These internal skip connections may be non-recurrent connections.

In yet further an additional embodiment, the proposed generator/predictor is used within a Generative Adversarial Network (GAN), which allows for training the generator in a more effective way. In particular, the proposed discriminator of the GAN may be designed in such a way to mimic the encoding and recurrent structure of the generator. Furthermore, the present embodiments propose to utilize a multi-layer discriminator structure, where multiple discriminators are used. In particular, one discriminator per convolution layer may be used.

These embodiments are discussed next in more detailed manner.

As mentioned, the present embodiments relate to future video prediction. In particular, the goal is to receive N past video frames and to predict [N+1, N+2, . . . , N+k] future video frames, for any given integer k. Predicting future video frames does not necessarily mean that the predictions are exactly the same as they are in reality, but these frames are desired to be as realistic (or plausible) as possible, given the past frames. There are several ways to evaluate the predicted frames. One common approach is to evaluate how well the model preserves the following aspects in predicted frames: the identity of each object, the local features (e.g., edges, shapes), and the overall motion of the objects.

The present embodiments may utilize deep learning models, i.e., artificial neural networks. According to an embodiment, the system may use convolutional layers, Long Short-Term Memory (LSTM) layers, dense or fully-connected layers, and softmax or classification layers. Apart from LSTMs, other types of models for modeling the temporal aspect of video data may be employed. The data being processed by the present system is considered to consist of frames extracted from a video and de-compressed.

In the present solution, there is a convolutional encoder-decoder model, which embeds also recurrent lateral connections between the encoder and the decoder. This allows for building multi-level recurrent summaries of the seen data (past frames), which allows for predicting future data with much more information about the intermediate-level temporal representations.

Figure 6:
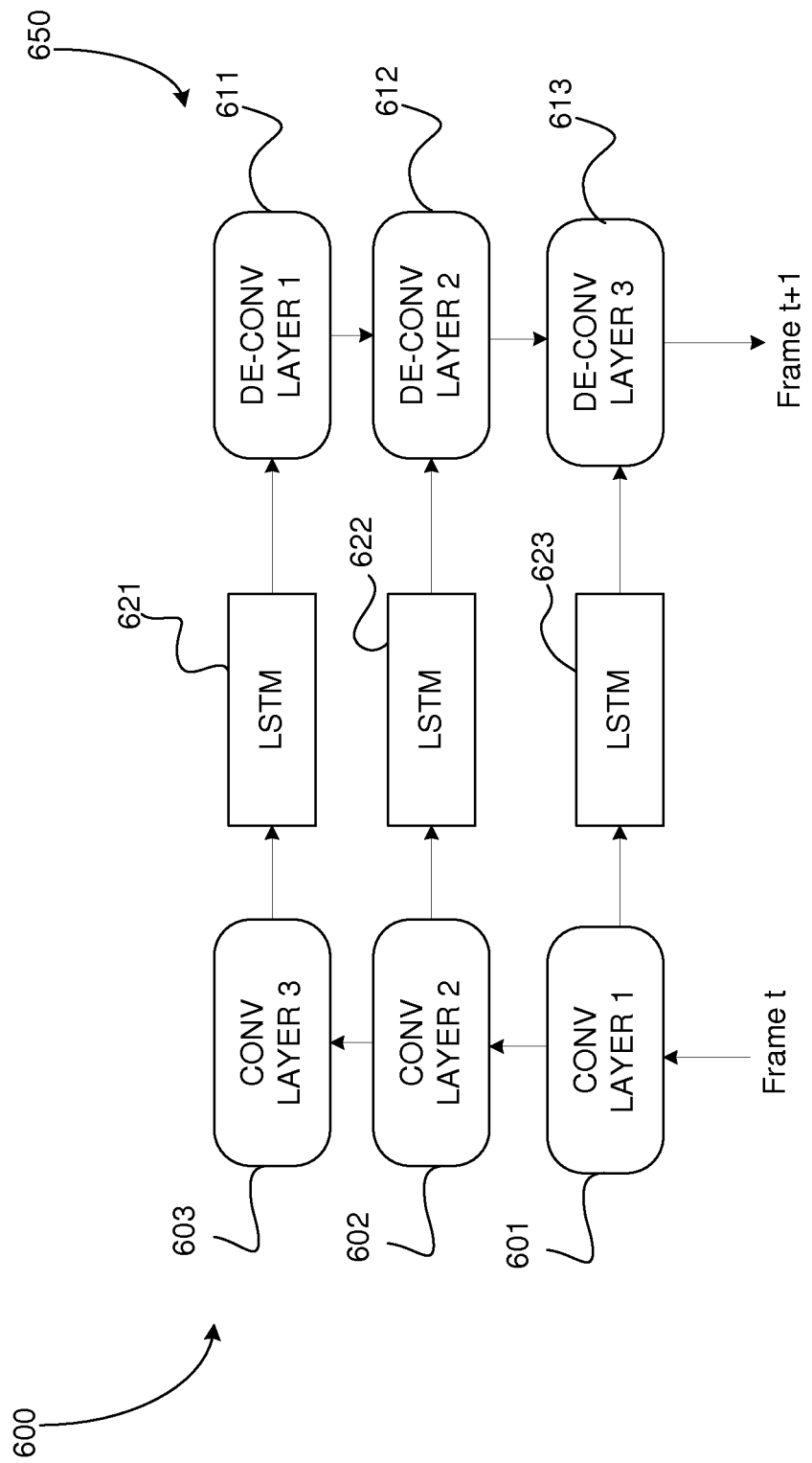
FIG. 6 shows an example of an encoder-decoder system according to an embodiment.

FIG. 6 illustrates an example of a system for video prediction according to an embodiment. In the figure, "CONV-LAYER" stands for convolutional layer, "DE-CONV LAYER" stands for de-convolutional layer (or, more precisely, transpose-convolution layers). All convolution layers 601, 602, 603 of the encoder 600 and transpose-convolution layers 611, 612, 613 of the decoder 650 are laterally connected via recurrent connections 621, 622, 623. By this, the system is able to model temporal evolutions of features at multiple levels of semantic hierarchy, which are then combined at the decoder side 650. The system is configured to receive media content, such as video frames by the convolution layers 601, 602, 603. The convolution layers 601, 602, 603 perform feature extraction of the media content and output layer-specific feature maps. The layer-specific feature maps are transmitted to de-convolution layers 611, 612, 613 via the recurrent lateral connections 621, 622, 623. The de-convolution layers 611, 612, 613 generate the reconstructed media content, for example predicted future frames, based on the feature maps from the encoder, eventually further processed by the recurrent lateral connections and by previous de-convolutional layers.

In many cases it is beneficial to force higher layers of the system to have larger receptive field. This can be implemented in various ways, for instance with normal convolution and max pooling, with normal but strided convolution, or with dilated convolution in the encoder and reverse operations in the decoder.

According to an embodiment, only some of the convolutional layers are laterally coupled to the corresponding de-convolution layers. For example, in one example embodiment, convolutional layers 601, 603 of FIG. 6 may be laterally connected through LSTMs 623, 621 to de-convolution layers 613, 611, respectively, but there may not be a lateral connection from convolutional layer 602 to de-convolutional layer 612. It is therefore possible to balance between the performance and the complexity of the video prediction system. It is also possible to optimize the encoder-decoder model for certain levels of features, which correspond to the laterally coupled convolution layers. It is also possible to apply the recurrent connection(s) to capture the temporal variations only at the layer(s) where temporal variations are expected. Furthermore, lateral connections may be non-symmetric between the encoder layers and the decoder layers. For example, the output of CONV LAYER 1 may be laterally connected to the input of DE-CONV LAYER 2. Hence, a feature map from an encoder layer may be provided through a lateral connection to a corresponding decoder layer, which may be in a different respective position in the stack of decoder layers compared to the encoder layer. In some embodiments, one or more feature maps from the plurality of encoder layers may be coupled to corresponding decoder layers via such non-symmetric, recurrent and/or non-recurrent, connections.

Figure 7A:
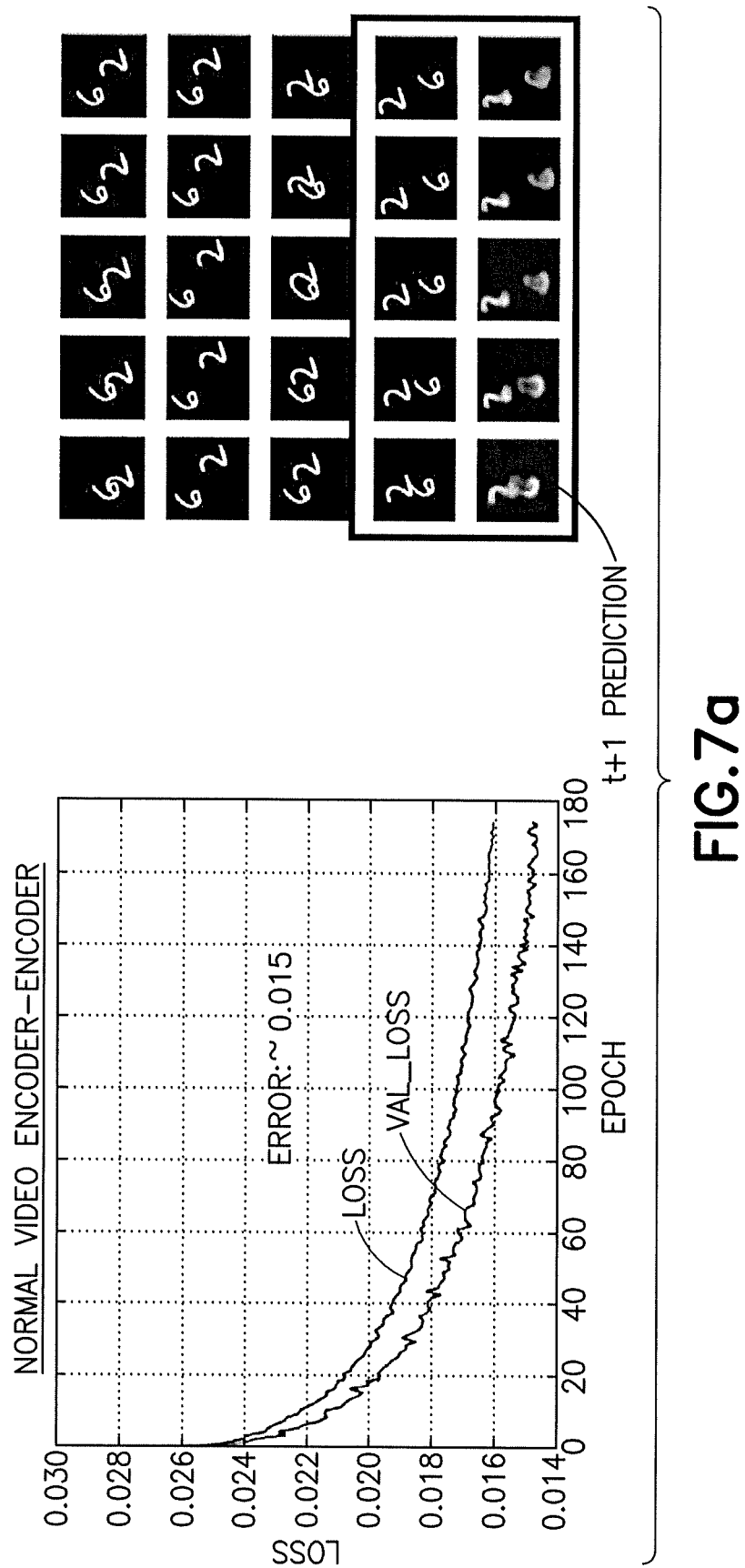
FIGS. 7a, b show experimental results comparing the encoder-decoder system of related technology and the encoder-decoder system according to an embodiment.
Figure 7B:
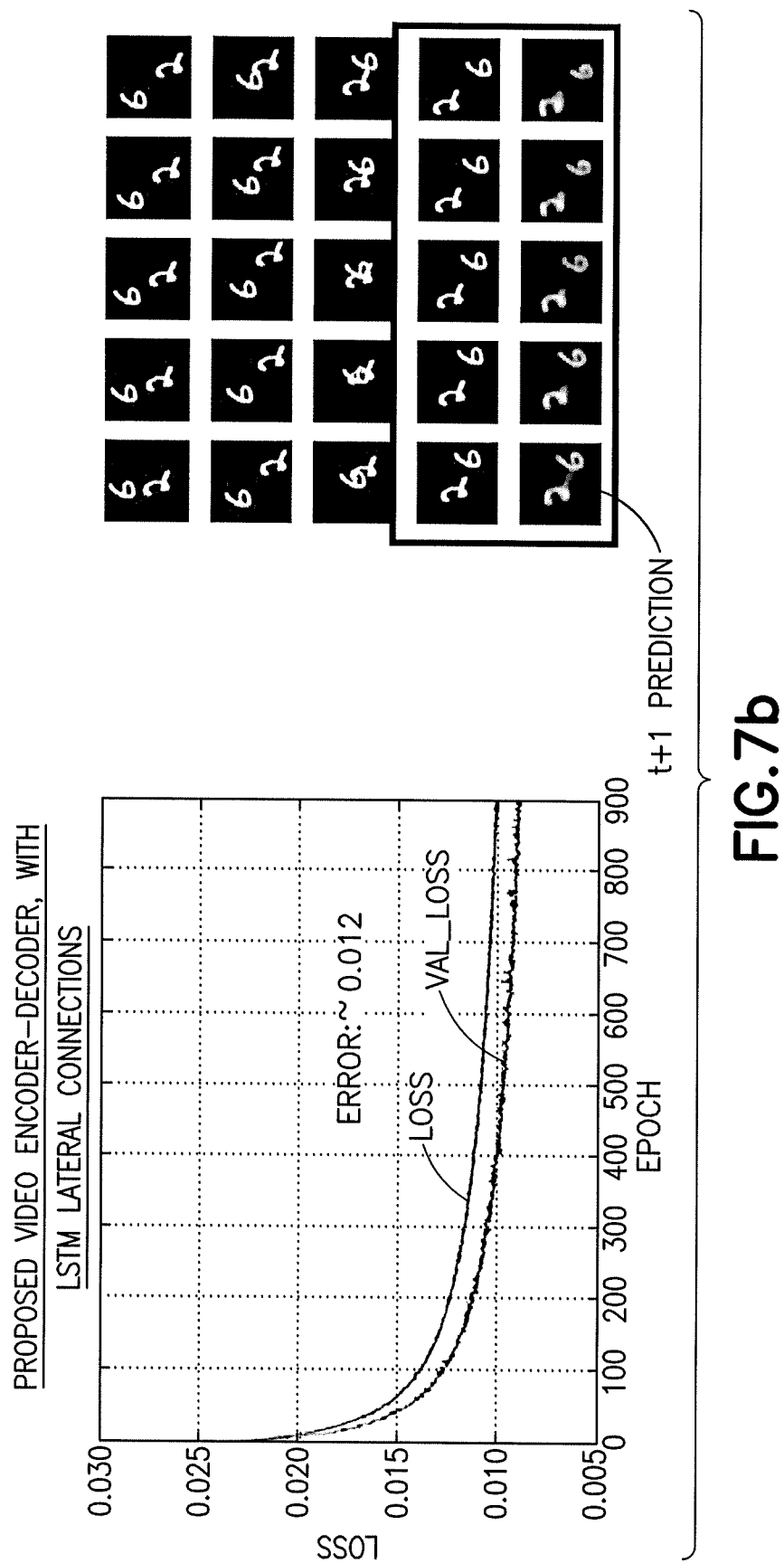

FIG. 7 illustrates experimental results comparing the conventional video encoder-decoder of FIG. 7a and the video encoder decoder according to embodiment with recurrent (LSTM) lateral connections of FIG. 7b.

Figure 8A:
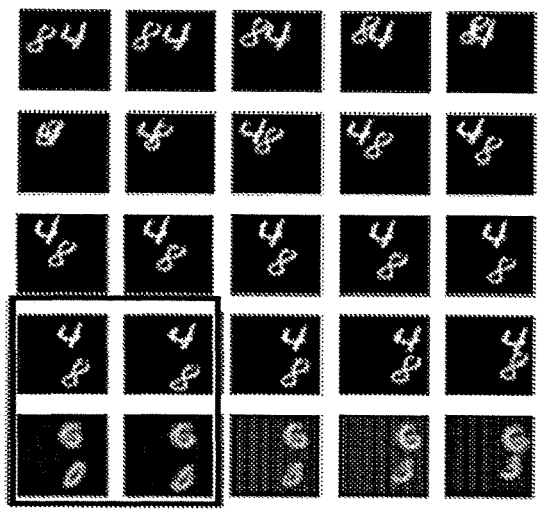
FIG. 8a shows results of an encoder-decoder system according to related technology without recurrent lateral connections.
Figure 8A:
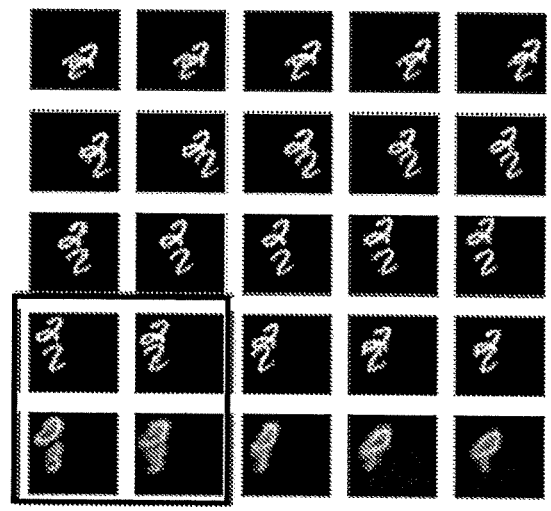
Figure 8B:
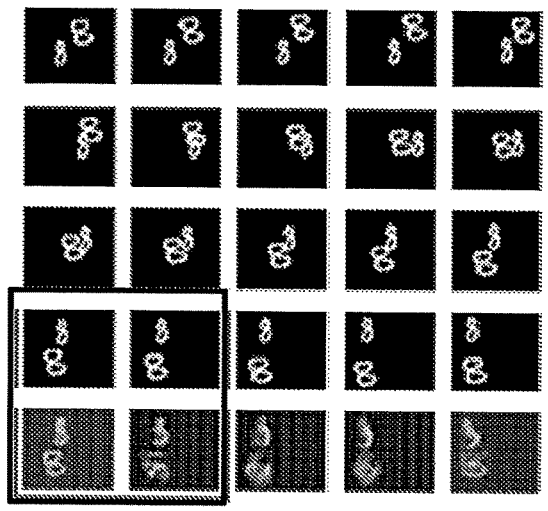
FIG. 8b shows results of an encoder-decoder system according to an embodiment with recurrent lateral connections.
Figure 8B:
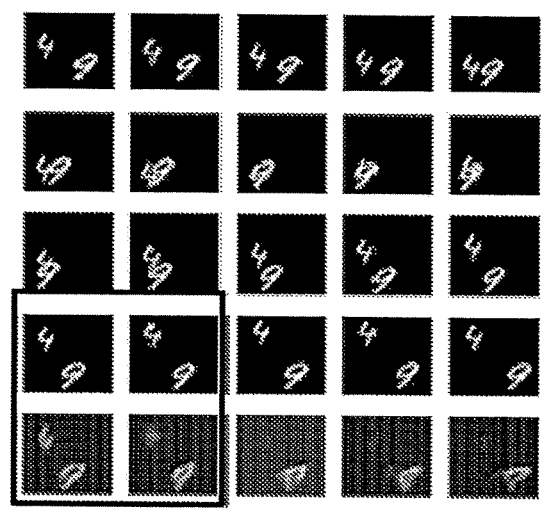

Apart from the advantages in predicting future frames for object classes that the system has already seen during training, the system according to an embodiment is able to generalize beyond training data. In other words, when provided with videos of similar data but different object classes, the system according to an embodiment is able to predict future frames with less ambiguity about the class. This is because the system does not use only the top level information, which encodes mainly class information, but it uses also lower-level information that helps to reconstruct the data from details and parts of object. The lower layers can mitigate the lack of high-level information (i.e., classes), by using LSTM lateral connections at multiple layers. FIG. 8a shows experimental results of a conventional video encoder-decoder system without recurrent lateral connections and FIG. 8b shows experimental results of a system according to an embodiment with recurrent lateral connections. The systems are trained on predicting future frames for classes (digits) [0, 1, 3, 5, 6, 7] and tested on classes [2, 4, 8, 9]. The systems are provided with 15 past frames from the test set (with classes never seen before) and are asked to predict the future frames. The system of FIG. 8a without recurrent lateral connections uses only high-level information (class information) and quickly converts the test digits into the digits that it knows from the training data. The system of FIG. 8b, on the other hand, uses intermediate and low-level information for generating the new classes in future frames. With recurrent lateral connections instead, the system tries to keep up for as long as possible the new classes.

Figure 9:
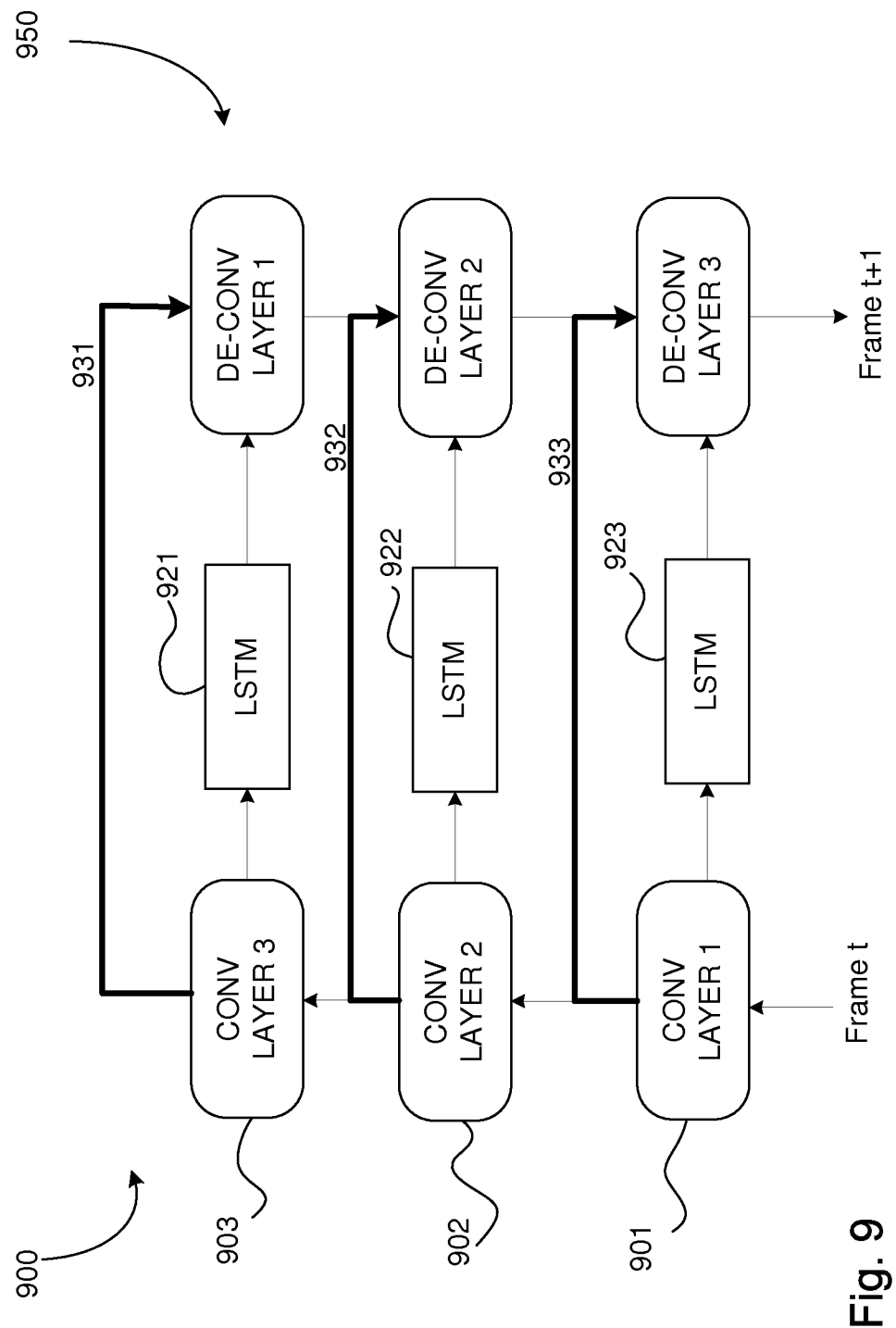
FIG. 9 shows an example of an encoder-decoder system according to a further embodiment.
Figure 10:
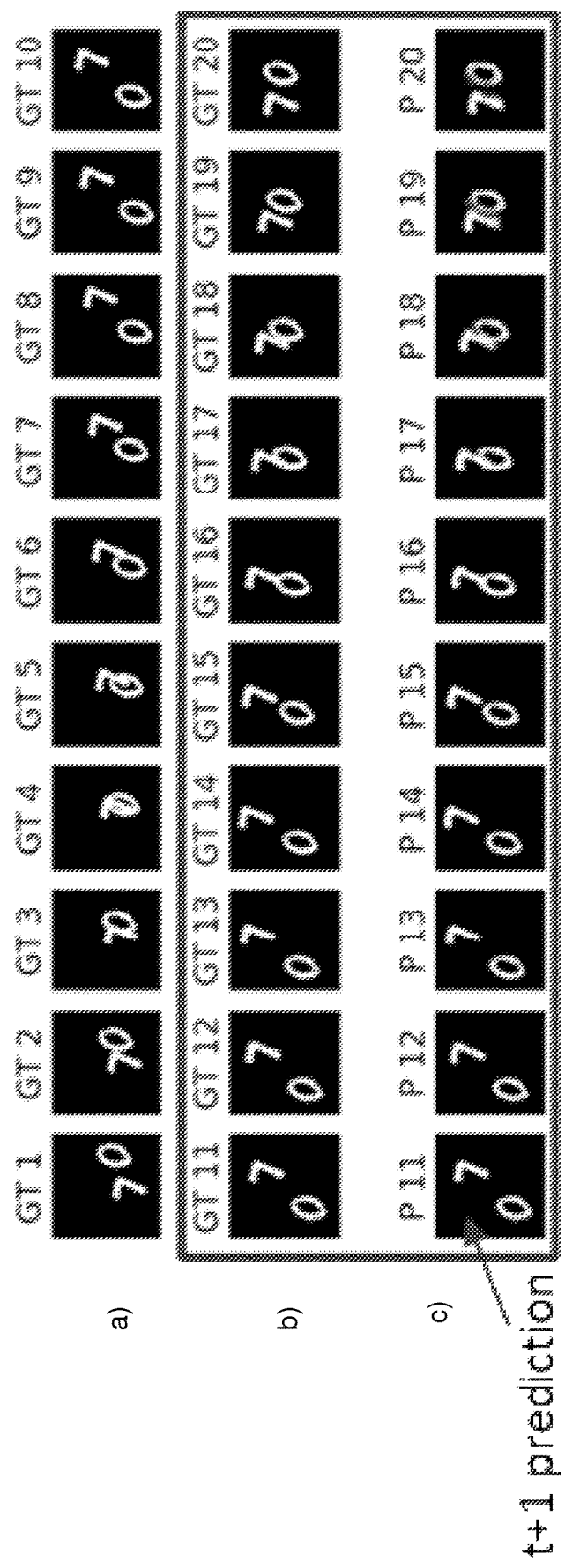
FIG. 10 shows experimental results of an encoder-decoder system according to a further embodiment.

According to a further embodiment, shown in FIG. 9, direct multi-layer information about latest past frame is used. In this embodiment, the decoder 950 is allowed to use direct information about all encoder's 900 convolution layers 901, 902, 903 for the latest past frame, which is the one which should influence the future prediction the most, especially at intermediate and lower levels. This is implemented by adding direct lateral connections 931, 932, 933 to the system in addition to the recurrent lateral connections 921, 922, 923. With the system of FIG. 9, improvements in predicting future frames are obtained, as shown in FIG. 10. In FIG. 10, the first row (a) is the ground-truth past frames (i.e., the input to the system), the middle row (b) is the ground-truth future frames (not seen by the system), and bottom row (c) is the future frames predicted by the system.

According to an embodiment, only some of the convolutional layers of FIG. 9 are laterally coupled to the corresponding de-convolution layers with both the recurrent and direct connections. Some convolutional layers may not be connected at all and some layers may be connected by a direct or recurrent (e.g. LSTM) connection only. For example, in one example embodiment, convolutional layer 903 may be laterally connected through a recurrent connection 921 without the direct connection 931. Convolutional layer 902 may be laterally connected through a direct connection 932 and a recurrent connection 922. Convolutional layer 901 may be laterally connected through a direct connection 933 and without a recurrent connection 933. It is therefore possible to balance between the performance and the complexity of the video prediction system. It is also possible to optimize the encoder-decoder model for certain levels of features, which correspond to the laterally coupled convolution layers. It is also possible to apply the recurrent connection(s) to capture the temporal variations only at the layer(s) where temporal variations are expected. Therefore, in different embodiments of the invention different combinations of lateral recurrent and/or direct or no connection may be applied.

According to a yet further embodiment, the system can be extended to be adapted to a Generative Adversarial Network (GAN) framework. In GAN, the training phase is a battle or game between a generator G and a discriminator D. Both the generator G and the discriminator D may be neural networks. The generator G has the goal of generating realistic-looking data (future video frames). The discriminator D sometimes gets as an input "fake" data generated from the generator G and sometimes real data from a dataset. The goal of the discriminator D is to correctly discriminate when the input is fake or real.

Figure 11:
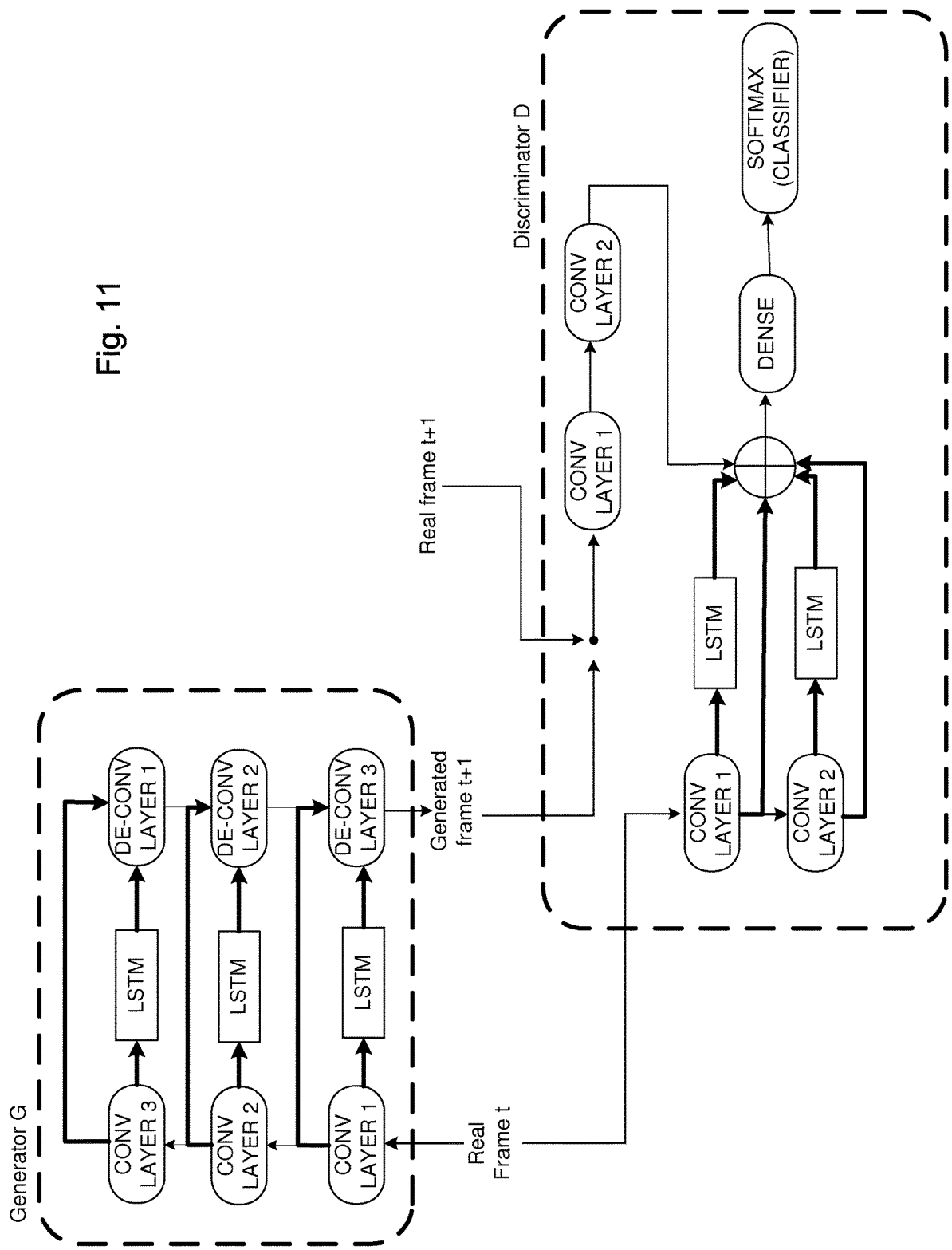
FIG. 11 shows an example of an encoder-decoder system according to a further embodiment being adapted to a Generative Adversarial Network.

FIG. 11 illustrates a system according to an embodiment being adapted to the GAN network. In the system of FIG. 11, the generator G corresponds to the system of FIG. 9, i.e., the encoder-decoder model with recurrent and direct lateral connections. In the discriminator D, a similar structure may be mimicked as in the generator G, for handling the multi-level temporal summaries when analyzing the past frames. The discriminator D receives N real past frames, and the future frame N+1. The future frame N+1 is sometimes a fake (generated) frame and sometimes it's a real frame. The discriminator D may comprise a first set of convolutional layers, each followed by a recurrent and a direct connection to a combiner. The discriminator may also comprise second set of convolutional layers connected to the combiner. The past frames are fed to the first set of convolutional layers. After all the past frames have been processed, a summary representation will be output by the recurrent network. The generated future frame, or from time to time the real future frame, is fed to the second set of convolutional layers.

The discriminator D is configured to discriminate, based on the past frames and the given future frame, whether the future frame is fake or real.

The dense layer is a fully-connected layer. In the example of FIG. 11, there is only one dense layer. However, there may be any number of dense layers. The purpose of the dense layers is to reshape the dimensionality of the combiner's output, according to the following layer (the softmax layer), and to further process the data. The softmax layer is a classification layer. It outputs a probability distribution. In this case, it outputs a probability that the input future frame is real and a probability that the input future frame is fake (i.e., generated).

It is appreciated that in FIG. 11, the system structure of the discriminator D is just an example, and other structures of the discriminator D different from the FIG. 11 are possible. For example, the discriminator D may be structured to mimic the encoder-decoder models discussed in connection with FIG. 6, that is, to include lateral recurrent connections without the direct connections to the combiner.

In the system of FIG. 11 the discriminator D receives only the finalized reconstruction/prediction of the future frame from the generator G for analysis. It would be beneficial to let the discriminator D to analyze also the intermediate steps that the generator G took for predicting the future frame. Therefore, according to an embodiment, multiple discriminators D are used—one for each layer of the generator's G decoder, where each discriminator D may have a similar structure as the discriminator D in FIG. 11.

Figure 12:
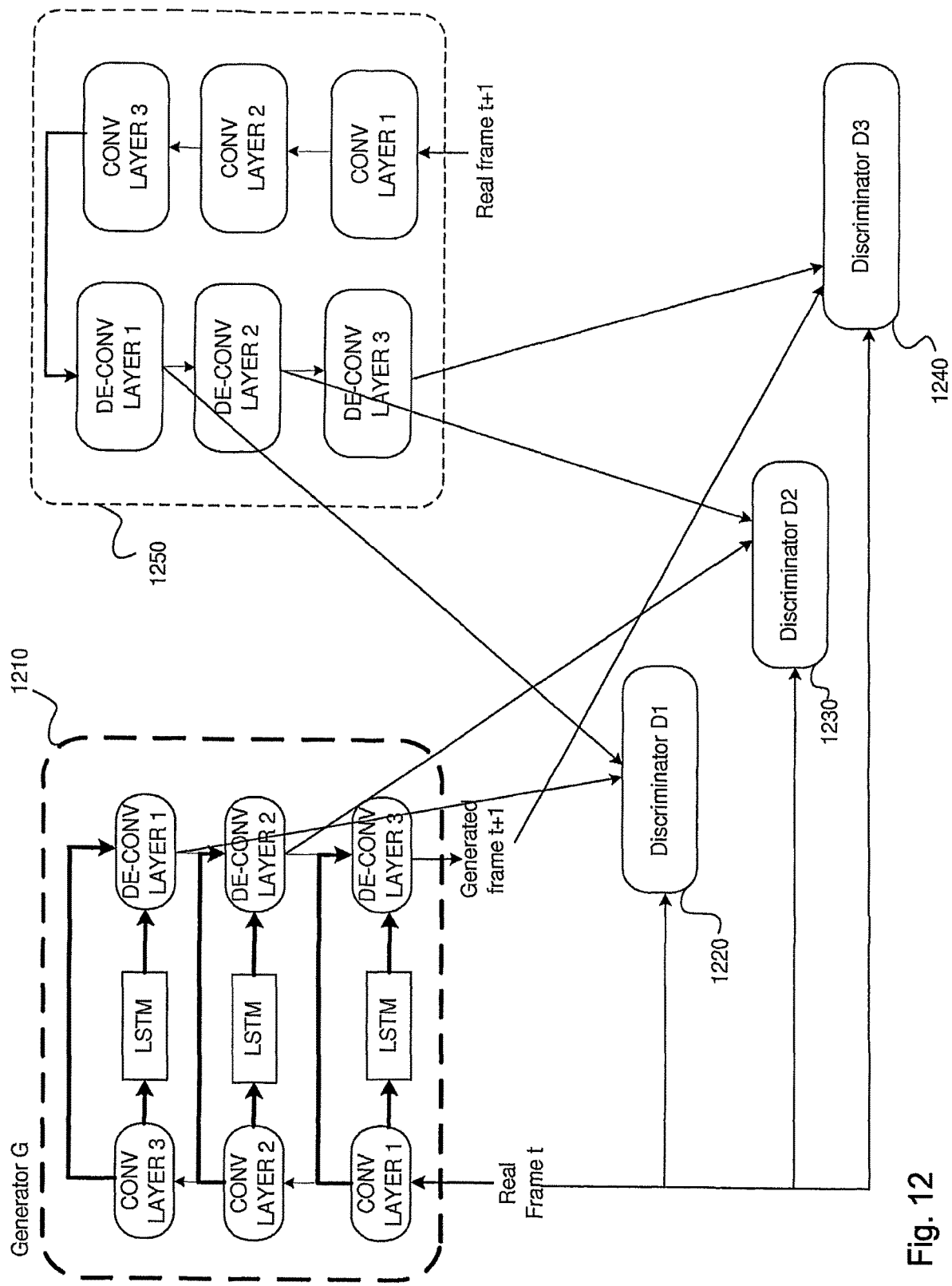
FIG. 12 shows an example of an encoder-decoder system according to a further embodiment being adapted to a Generative Adversarial Network having a plurality of discriminators.

The discriminator D is expected to discriminate fake data from real data, but the real data is not readily available at multiple reconstruction levels, since the real data is not generated by definition. Therefore, according to a further embodiment of the present solution, an additional encoder-decoder model for reconstructing the input real future frame is proposed. In such a system the reconstructions at multiple levels of the decoder may be used as the input to the multiple discriminators. FIG. 12 illustrates an embodiment of the system to work within a GAN framework. As shown in FIG. 12, the generator G 1210 is similar as the one shown in FIG. 9. The system of FIG. 12 further comprises multiple discriminators 1220, 1230, 1240, one for each decoder's convolution layer. These discriminators may be similar to discriminator D of FIG. 11. In order to obtain multiple reconstructions also for the real data, an additional encoder-decoder system 1250 is used for reconstructing the real future frame. The GAN model network can be trained by using the losses from all the discriminators 1220, 1230, 1240.

Discriminator D1 may take as an input the output of de-convolution layer 1 of the generator 1210. Data from generator G is generally input to the set of convolutional layers corresponding to the first set of convolutional layers of discriminator D of FIG. 11. Discriminator D1 takes as another input the output of de-convolution layer 1 of the additional encoder-decoder system 1250. Data from the additional encoder-decoder system 1250 is generally input to the set of convolutional layers corresponding to the second set of convolutional layers of discriminator D of FIG. 11. The first de-convolutional layers of generator 1210 and the additional encoder-decoder system 1250 may correspond to the innermost de-convolution layer of generator 1210 and additional encoder-decoder system 1250. Discriminators D2 and D3 take inputs from the second and third convolutional layers of the generator 1210 and from an additional encoder-decoder system 1250.

Figure 13:
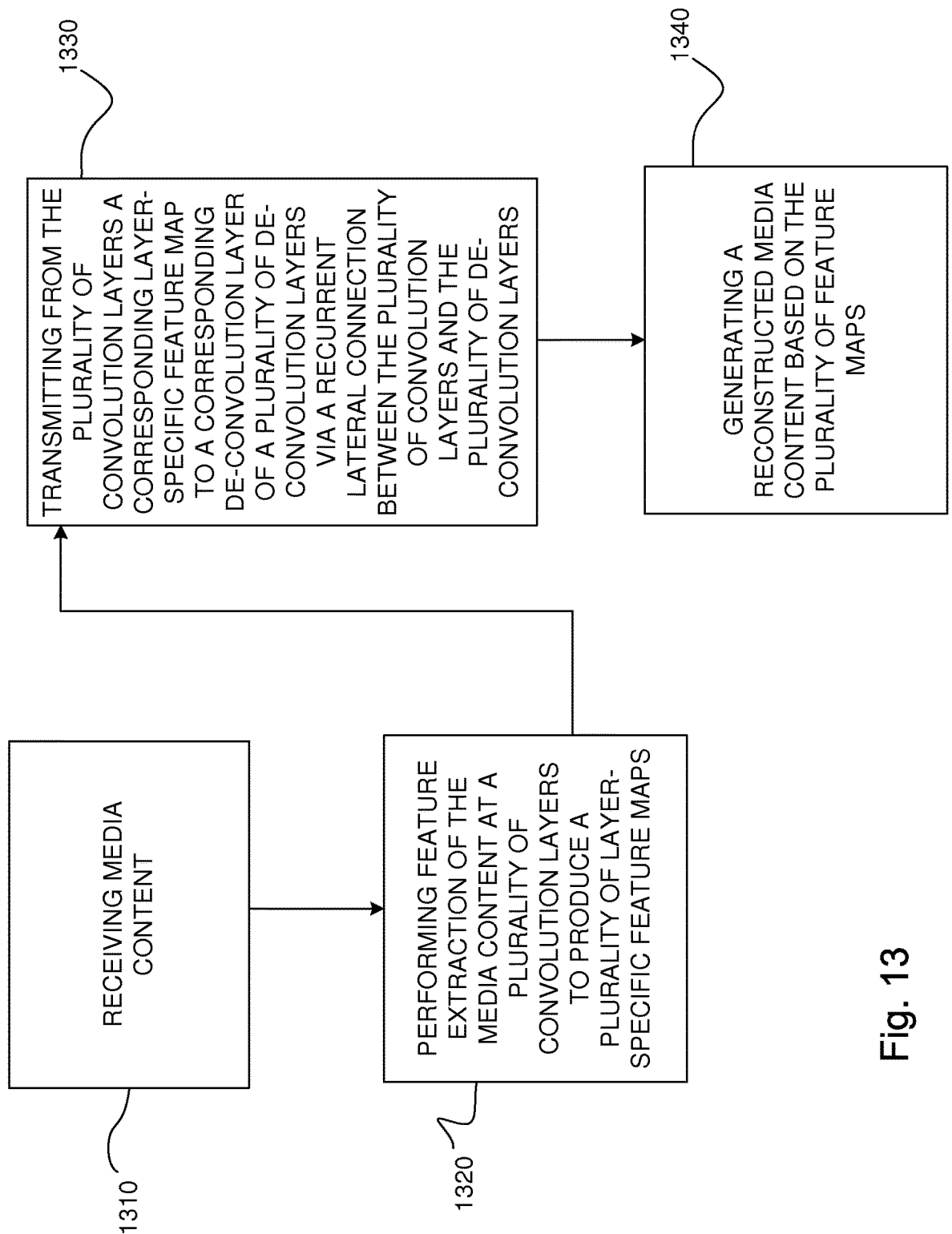
FIG. 13 is a flowchart illustrating a method according to an embodiment.

FIG. 13 is a flowchart of a method according to an embodiment. The method comprises receiving media content 1310; performing feature extraction of the media content at a plurality of convolution layers to produce a plurality of layer-specific feature maps 1320; transmitting from the plurality of convolution layers a corresponding layer-specific feature map to a corresponding de-convolution layer of a plurality of de-convolution layers via a recurrent lateral connection between the plurality of convolution layers and the plurality of de-convolution layers 1330; and generating a reconstructed media content based on the plurality of feature maps 1340.

The apparatus according to an embodiment comprises means for implementing the method, for example: means for receiving media content; means for performing feature extraction of the media content at a plurality of convolution layers to produce a plurality of layer-specific feature maps; means for transmitting from the plurality of convolution layers a corresponding layer-specific feature map to a corresponding de-convolution layer of a plurality of de-convolution layers via a recurrent connection between the plurality of convolution layers and the plurality of de-convolution layers; and means for generating a reconstructed media content based on the plurality of feature maps. These means comprises at least one processor, a memory including computer program code, wherein the memory and the computer program code configured to, with the at least one processor, cause the apparatus to implement the method.

The various embodiments may provide advantages. The solution provides an elegant and effective architecture for predicting future video frames. The recurrent lateral connections allow for building multi-level temporal summaries, which allow the decoder to get information about the temporal evolution of all the convolution layers, not only of the top level, which encodes only information about shapes, objects, etc. Future video frame prediction is a holy grain for deep learning and computer vision, because of its wide applications (video denoising, video inpainting, video segmentation, choosing actions based on predicted consequences for robotics). Also, detailed human labelling of videos is not feasible. The present embodiments may also improve the predictions. It is to be noticed that the present embodiments are not restricted to future video prediction, but it can be readily applied to video reconstruction when big chunks of data are missing (i.e. video inpainting), video denoising, video segmentation, choosing the right action based on internal prediction of consequences.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
receiving a media content;
performing feature extraction of the media content at a plurality of convolution layers to produce a plurality of layer-specific feature maps;
transmitting from the plurality of convolution layers a corresponding layer-specific feature map to a corresponding de-convolution layer of a plurality of de-convolution layers via a direct recurrent connection between a convolution layer of the plurality of convolution layers and the corresponding deconvolution layer of the plurality of de-convolution layers; and
generating, with the plurality of de-convolution layers, a reconstructed media content based on the plurality of layer-specific feature maps.

2. The method according to claim 1, wherein the media content comprises video frames, and wherein the reconstructed media content comprises predicted future video frames.

3. The method according to claim 1, wherein the recurrent connection comprises a long short-term memory network.

4. The method according to claim 1, further comprising providing the reconstructed media content and corresponding original media content to a discriminator system, wherein the discriminator system is configured to determine whether the reconstructed media content is real.

5. The method according to claim 4, wherein the discriminator system comprises a plurality of discriminators corresponding to the plurality of de-convolution layers.

6. The method according to claim 5, further comprising providing, to respective discriminators of the plurality of discriminators, the reconstructed media content from a corresponding de-convolution layer of a plurality of additional de-convolution layers.

7. An apparatus comprising processor circuitry, at least one non-transitory memory including computer program code, wherein the at least one memory and the computer program code, with the processor circuitry, configured to cause the apparatus to perform at least the following:
receive media content;
perform feature extraction of the media content at a plurality of convolution layers to produce a plurality of layer-specific feature maps;
transmit from the plurality of convolution layers a corresponding layer-specific feature map to a corresponding de-convolution layer of a plurality of de-convolution layers via a direct recurrent connection between a convolution layer of the plurality of convolution layers and the corresponding de-convolution layer of the plurality of de-convolution layers; and
generate, with the plurality of de-convolution layers, reconstructed media content based on the plurality of layer-specific feature maps.

8. The apparatus according to claim 7, wherein the media content comprises video frames, and wherein the reconstructed media content comprises predicted future video frames.

9. The apparatus according to claim 7, wherein the recurrent connection comprises a long short-term memory network.

10. The apparatus according to claim 7, wherein the apparatus is further caused to provide the reconstructed media content and corresponding original media content to a discriminator system, wherein the discriminator system is configured to determine whether the reconstructed media content is real.

11. The apparatus according to claim 10, wherein the discriminator system comprises a plurality of discriminators corresponding to the plurality of de-convolution layers.

12. The apparatus according claim 11, wherein the apparatus is further caused to provide, to respective discriminators of the plurality of discriminators, the reconstructed media content from a corresponding de-convolution layer of a plurality of additional de-convolution layers.

13. A computer program product embodied on a non-transitory computer readable medium, comprising computer program code, which when executed with at least one processor, cause an apparatus or a system to:
receive media content;
perform feature extraction of the media content at a plurality of convolution layers to produce a plurality of layer-specific feature maps;
transmit from the plurality of convolution layers a corresponding layer-specific feature map to a corresponding de-convolution layer of a plurality of de-convolution layers via a direct recurrent connection between a convolution layer of the plurality of convolution layers and the corresponding de-convolution layer of the plurality of de-convolution layers; and generate, with the plurality of de-convolution layers, reconstructed media content based on the plurality of layer-specific feature maps.

14. The computer program product according to claim 13, wherein the media content comprises video frames, and wherein the reconstructed media content comprises predicted future video frames.

15. The computer program product according to claim 13, wherein the recurrent connection comprises a long short-term memory network.

16. The computer program product according to any of the claim 13, wherein the apparatus or the system is further caused to provide the reconstructed media content and corresponding original media content to a discriminator system, wherein the discriminator system is configured to determine whether the reconstructed media content is real.

17. The computer program product according to claim 16, wherein the discriminator system comprises a plurality of discriminators corresponding to the plurality of de-convolution layers.

18. The computer program product according claim 17, wherein the apparatus or the system is further caused to provide, to respective discriminators of the plurality of discriminators, the reconstructed media content from a corresponding de-convolution layer of a plurality of additional de-convolution layers.

19. The method according to claim 1, wherein the transmitting from the plurality of convolution layers the corresponding layer-specific feature map to the corresponding de-convolution layer comprises:

transmitting, from a first convolution layer of the plurality of convolution layers, a first layer-specific feature map to a first de-convolution layer of the plurality of de-convolution layers via a first recurrent connection; and transmitting, from a different second convolution layer of the plurality of convolution layers, a second layer-specific feature map to a second de-convolution layer of the plurality of de-convolution layers via a second recurrent connection.

20. The method according to claim 1, further comprising transmitting, from the plurality of convolution layers, direct information to the corresponding de-convolution layer of the plurality of de-convolution layers via the direct recurrent connection between the convolution layer of the plurality of convolution layers and the corresponding de-convolution layer of the plurality of de-convolution layers.

* * * * *